Oct. 9, 1956

C. W. STONE 2,766,050

TILTING TRAILER BED

Filed March 19, 1954

Clarence W. Stone
INVENTOR.

BY *Clarence A. O'Brien
and Harvey B. Jacobson*
Attorneys

Oct. 9, 1956
C. W. STONE
2,766,050
TILTING TRAILER BED
Filed March 19, 1954
3 Sheets-Sheet 2
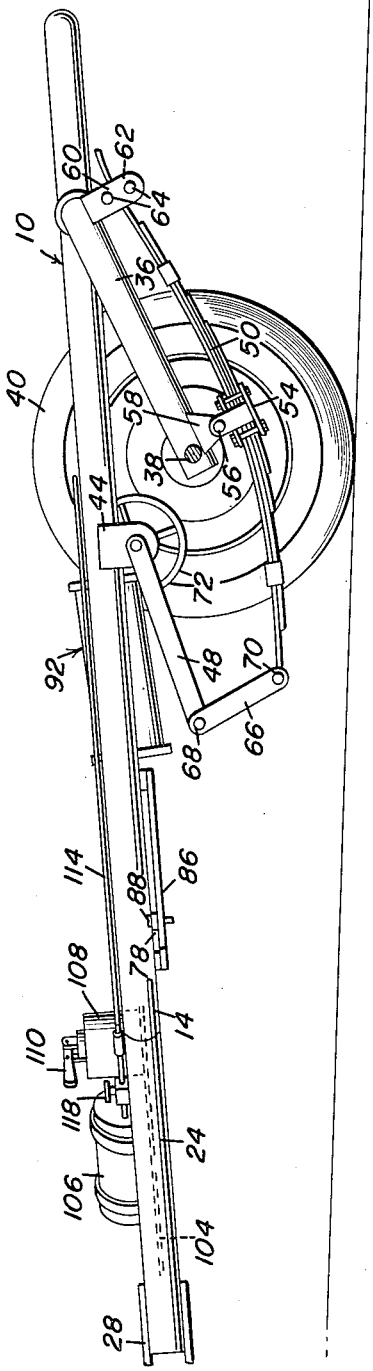
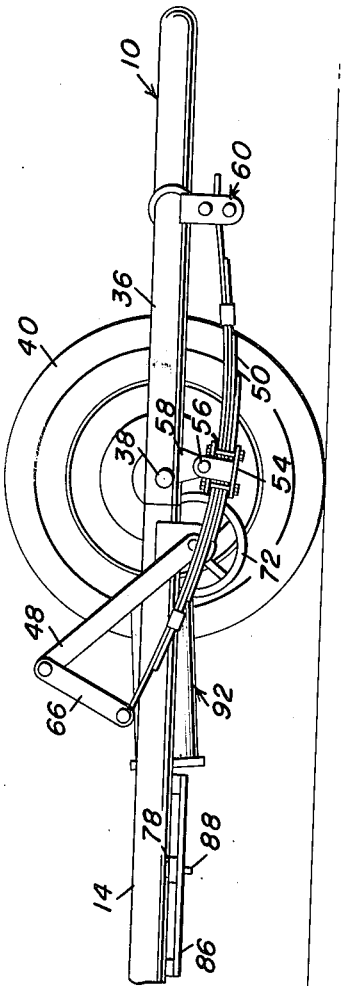
Clarence W. Stone
INVENTOR.

Oct. 9, 1956   C. W. STONE   2,766,050
TILTING TRAILER BED
Filed March 19, 1954   3 Sheets-Sheet 3

Clarence W. Stone
INVENTOR.

BY *Clarence A. O'Brien*
*and Harvey B. Jacobson*
Attorneys

United States Patent Office 2,766,050

Patented Oct. 9, 1956

2,766,050

TILTING TRAILER BED

Clarence W. Stone, Coquille, Oreg.

Application March 19, 1954, Serial No. 417,247

5 Claims. (Cl. 280—44)

This invention relates in general to improvements in trailers and more specifically to a trailer having a tilting bed.

At the present time trailers are being utilized for carrying relatively small heavy pieces of equipment. In order that the trailers may have sufficient clearance so as to negotiate the ground over which the equipment must be hauled, the beds of such trailers must be off of the ground a considerable distance. Thus, it is extremely difficult to load the heavy equipment on the beds of such trailers.

A primary object of this invention is to provide an improved trailer which has a tilting bed construction, the bed construction being of such nature that sufficient clearance is provided for the trailer bed and the trailer bed is so mounted that it may be selectively tilted to permit the loading and unloading of equipment.

Another object of this invention is to provide an improved trailer having a tilting bed construction, the tilting bed being tiltable both upwardly and downwardly whereby equipment may be loaded and unloaded both to the ground and to an elevated platform.

Another object of this invention is to provide an improved tilting bed trailer which includes a suspension of such nature that the bed of the trailer is resiliently mounted to take care of road shocks and at the same time is so mounted that transverse tilting is eliminated.

A further object of this invention is to provide a tilting trailer construction which includes means for selectively tilting the trailer, the means being of such nature that it may be remotely controlled.

A still further object of this invention is to provide an improved trailer construction which includes a tilting bed, the trailer construction having a running gear which includes means for tilting the bed of a trailer, the means for tilting the bed also functioning as a stabilizing device so that the trailer bed will not tilt transversely or sway when the trailer is being towed.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 2 is a side elevational view of the trailer of Figure 1 and shows the same with the trailer bed in an elevated position;

Figure 3 is a fragmentary side elevational view of the trailer of Figure 1 and shows the trailer bed in a normal running position;

Figure 1:
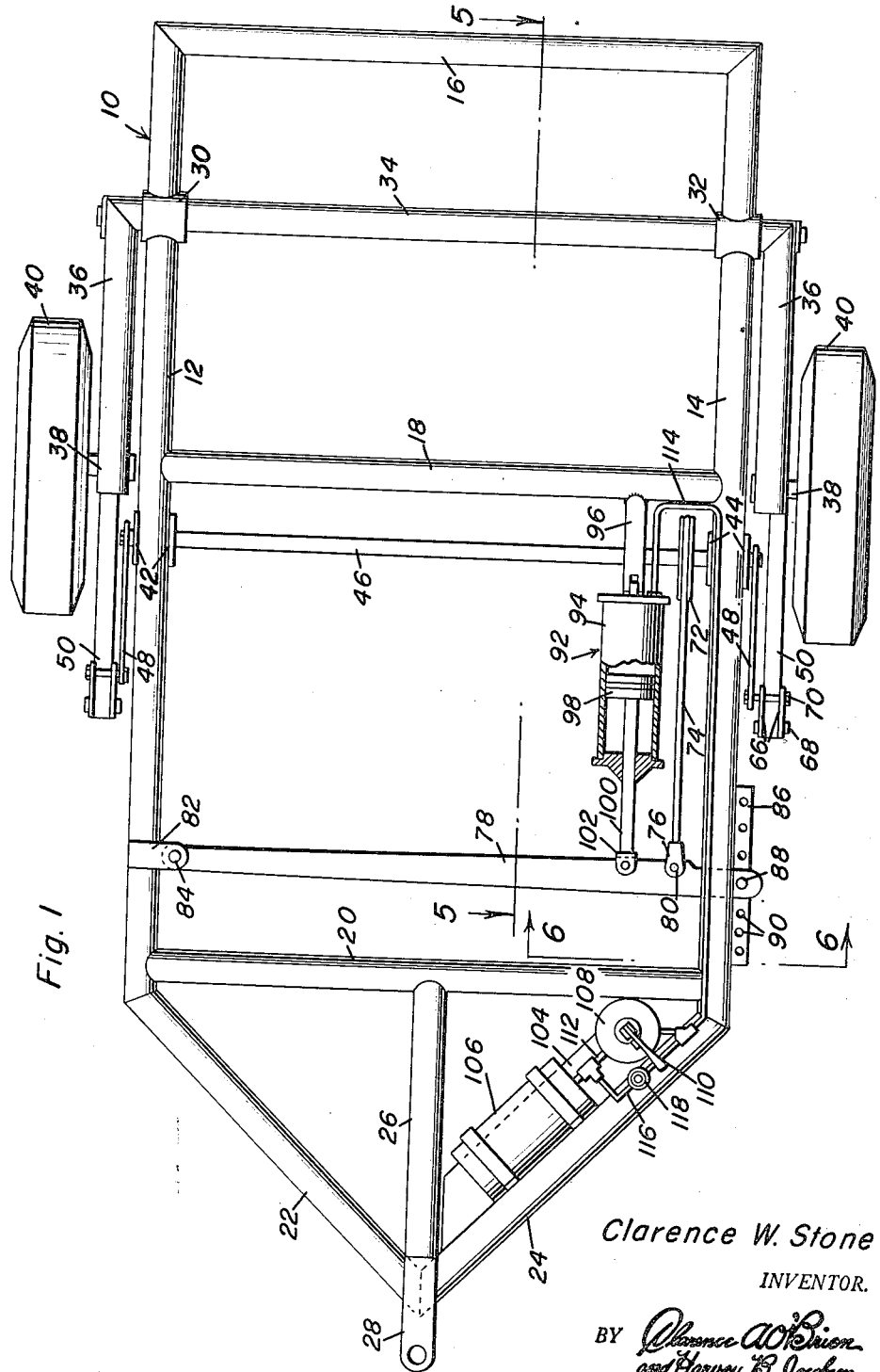
Figure 1 is a top plan view of the trailer construction which is the subject of this invention and shows the general details thereof, a load supporting platform for the trailer bed being omitted in order to clearly illustrate the details of the various features of the trailer, a portion of a fluid motor for actuating the tilting mechanism of the trailer being broken away and shown in section.

Referring now to the drawings in detail, it will be seen that there is illustrated the tilting trailer which is the subject of this invention. The tilting trailer includes a bed frame which is referred to in general by the reference numeral 10. The bed frame is formed of tubular frame members which include a pair of spaced parallel, longitudinally extending frame rails 12 and 14. The frame rails 12 and 14 are connected together at their rear ends by a rear cross frame member 16. The frame rails 12 and 14 are also connected together by an intermediate cross frame member 18 and a forward cross frame member 20. Secured to the forward ends of the frame rails 12 and 14 are forwardly converging frame members 22 and 24, respectively. A longitudinally extending frame member 26 extends between the inner section between the frame members 22 and 24 to the front cross frame member 20. Carried by the frame members 22, 24, and 26 is a suitable hitch member 28 for connecting the trailer to a towing vehicle.

The frame rails 12 and 14 are provided intermediate the cross frame members 16 and 18 with journal assemblies 30 and 32, respectively. The journal assemblies 30 and 32 are transversely aligned and have mounted therein for rocking movement a first transverse shaft 34. Secured to opposite ends of the first transverse shaft 34 are forwardly extending arms 36. The arms 36 are provided adjacent their forward free ends with outwardly extending axles 38. The axles 38 are transversely aligned and have rotatably mounted thereon supporting wheels 40.

Secured to opposite sides of the frame rails 12 near the forward part of its intersection with the intermediate cross frame member 18 are spaced parallel, depending plates 42. Also secured to the longitudinal frame rail 14 on opposite sides thereof are spaced parallel, depending plates 44. The plates 44 are in transverse alignment with the plates 42 and have aligned openings therein. Rockably journaled in the plates 42 and 44 is a second transverse shaft 46. Secured to the ends of the second transverse shaft 46 outside of the confines of the bed frame 10 is a pair of generally forwardly extending second arms 48.

Disposed at each side of the bed frame 10 is an elongated, longitudinally extending leaf spring 50. Each leaf spring 50 includes a central mounting bracket 54 which is pivotally connected by a pivot pin 56 to depending ears 58 carried by the associated first arm 36. It will be noted that the pivot pin 56 is disposed slightly rearwardly of the adjacent axle 38.

Carried by each of the first arms 36 in depending relation thereto is a fixed shackle assembly 60. The fixed shackle assembly 60 includes a pair of spaced parallel shackle elements 62 which are connected together by a pair of vertically spaced shackle bolts 64. A rear end of the leaf spring 50 passes between the shackle bolts 64 and is retained for substantially sliding movement only. It is to be understood that the leaf spring 50 will have its end portion thereof flexed with respect to the shackle construction 60.

The forward portion of the leaf spring 50 at each side of the bed frame 10 extends forwardly of the associated first arm 36 and is connected to the free end of an associated one of the second arms 48 by shackle links 66. The shackle links 66 are pivotally connected to the second arm 48 as at 68 and to the forward end of the leaf spring 50 as at 70.

Carried by the second shaft 46 adjacent the frame rail 14 is a crank wheel 72. The crank wheel 72 has entrained thereover an end portion of a flexible cable 74, the extreme end of the end portion of the flexible cable 74 being terminally secured to the crank wheel 72. The forward end of the flexible cable 74 is provided with a fitting 76 which is removably connected to a transverse bar 78 by a pin 80.

The transverse bar 78 is pivotally connected to a mounting bracket 82 carried by the frame rail 12 through the use of a pivot pin 84. The end of the transverse bar 78 adjacent the frame rail 14 rests upon a plate 86 extending below the frame rail 14 and is adjustably connected thereto by a pin 88 selectively positioned in one of a plurality of apertures 90 in the plate 86.

Figure 4:
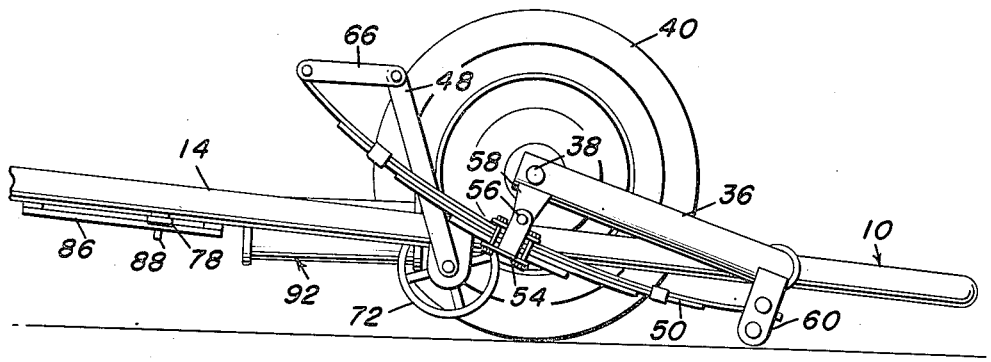
Figure 4 is a fragmentary side elevational view similar to Figure 3 and shows the trailer bed in a lowered position.
Figure 5:
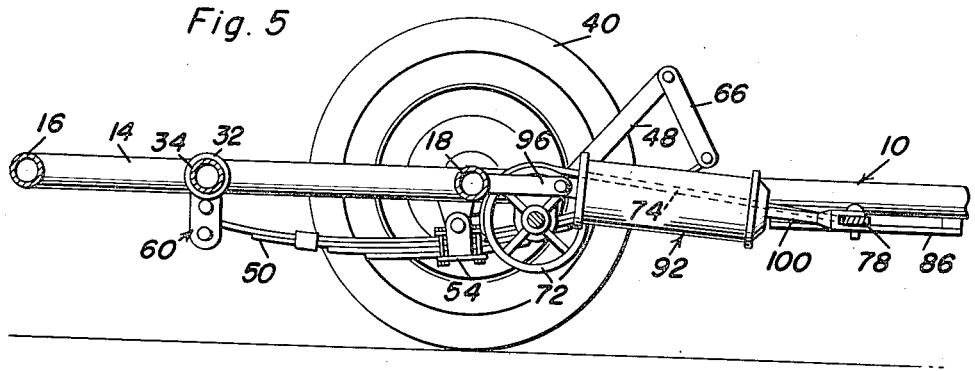
Figure 5 is a fragmentary longitudinal vertical sectional view taken substantially upon the plane indicated by the section line 5—5 of Figure 1 and shows the general relationship of the various components of the trailer.
Figure 6:
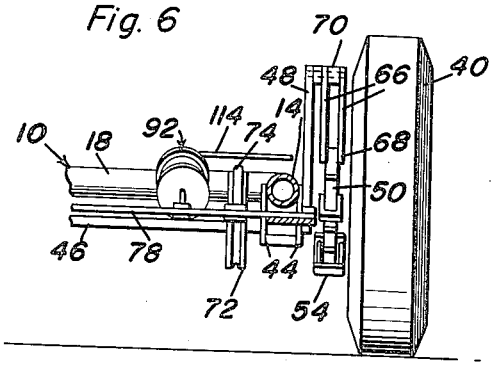
Figure 6 is a fragmentary transverse sectional view taken substantially upon the plan indicated by section line 6—6 of Figure 1 and shows the relationship of means for selective tilting of the trailer bed.

Referring now to Figure 3 in particular, it will be seen that the trailer is illustrated with the bed frame 10 in a horizontal position. It will be seen that the weight of the bed frame 10 has a tendency to cause downward movement thereof which would ordinarily result in the pivoting of the first arms 36 from their horizontal positions to their upwardly and forwardly sloping positions of Figure 4. However, since the forward ends of the springs 50 are restrained by the second arms 48 and their associated second shaft 46, it will be seen that the second arms 48 prevent the downward movement of the bed frame 10. Also, it will be seen that the weight of the bed frame 10 has a tendency to prevent pivoting of the first arms 36 to forward and downward tilting positions as best illustrated in Figure 2. Therefore, when the rocking of the second shaft 46 is prevented through the use of the transverse bar 78, the flexible cable 74 and the crank wheel 72, the bed frame 10 is retained in a preselected position.

In order that the bed frame 10 may be selectively tilted, there is provided a fluid motor which is referred to in general by the reference numeral 92. The fluid motor 92 includes a cylinder 94 which is carried by a mounting member 96 rigidly secured to the intermediate cross frame member 18. Slidably mounted within the cylinder 94 is a piston 98 which includes a piston rod 100 which extends through the forward end of the cylinder 94 and is connected by a fitting 102 to the transverse bar 78.

Mounted on the frame member 24 through the use of a supporting plate 104 secured thereto is a fluid reservoir 106. Also mounted on the plate 104 rearwardly of the fluid reservoir 106 is a hand operated pump 108 which includes a handle 110.

The inlet of the hand operated pump 108 is connected to the fluid reservoir 106 by piping 112. The outlet of the pump 108 is connected to the fluid motor 92 by piping 114. Thus, when the handle 110 of the pump 108 is actuated, fluid will be pumped from the fluid reservoir 106 to the fluid motor 92 to cause forward movement of the piston 98 to move the transverse bar 78 to a forward position. When this is being done, it is to be understood that the pin 88 is first removed.

In order that the bed frame 10 may be selectively lowered, there is provided a by-pass line 116. The by-pass line 116 is terminally connected to the piping 112 and 114 and by-passes the pump 108. The flow of fluid through the by-pass line 116 is controlled by a valve 118 mounted therein. Thus, when the valve 118 is opened, the piston 98 may be forced to the right, as viewed in Figure 1, to permit downward movement of the bed frame 10.

Referring now to Figure 3 in particular, it will be seen that the bed frame 10 is in a horizontal position. This is the normal running position of the bed frame 10. When it is desired to load or unload a device from the bed frame 10, the valve 118 is opened and the pin 88 is removed. This permits the piston 98 to be moved rearwardly and the resulting pivoting of the second arms 48 in a clockwise direction, as viewed in Figure 4, to the position illustrated in Figure 4. When the bed frame 10 is in its lowered position, the rear end thereof is closely adjacent the ground and the hitch 28 remains coupled to the towing vehicle.

When it is desired to unload from the trailer to a platform or the like, the bed frame 10 may be moved to an elevated position, as is best illustrated in Figure 2. In order to obtain this position, it is merely necessary to actuate the pump 108 to cause forward pivoting of the bar 78 and the rotation of the second arms 48 in a counter-clockwise direction. This results in the movement of the second arms 48 to the downward and forward tilting position of Figure 2 and the resultant downward and forward tilting relationship of the first arms 36 so that the rear end of the bed frame 10 is elevated while the hitch 28 remains at the same height and connected to the towing vehicle.

Inasmuch as the supporting wheels 40 are mounted well outside of the bed frame 10, it will be seen that the trailer is relatively stable. Further, inasmuch as the first arms 36 must move in unison, it will be seen that transverse tilting of the bed frame is prevented. Inasmuch as the first arms 36 must move in unison, it will be seen that one only of the springs 50 will retain the bed frame in a desired position in the event the other of the springs 50 should break. Thus, it is obvious that applicant has not only devised a novel running gear for a trailer which will permit the selective tilting of the bed frame thereof, but which also will effectively stabilize the bed frame and prevent both tilting of the bed frame when the trailer is rounding a curve and excessive swaying of the trailer at high speeds.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A tilting trailer bed construction comprising a bed frame including a forward hitch, a transverse shaft pivotally carried on the rear portion of said frame, a first pair of oppositely disposed forwardly extending arms each integrally connected to an opposite end of the transverse shaft which extends away from said frame, wheel supporting axles extending from the other ends of said arms, support wheels secured on each of said axles, longitudinally extending leaf springs intermediately pivotally supported on a lower portion of said arms on opposite sides of said frame, a second pair of forwardly extending arms pivotally connected at one end on opposite sides of said frame and longitudinally disposed between said forward hitch and the forward end of said first support arms, means operably connecting free ends of each of said springs respectively to the transverse shaft and the other end of said second forwardly extending arms, and means carried on said frame and operably connected to said second arms for adjustably rotating said second arms in unison about their pivotal connection on said frame and optionally tilting said frame upwardly or downwardly about the axis of the wheel support axles.

2. A tilting trailer bed construction as set forth in claim 1 wherein said means operably connecting the free ends of said springs comprises a lost motion slidable connection between the rear ends of said springs and said transverse shaft, the forward ends of each of said springs being pivotally connected to the forward end of one of said second arms by a pivotal link permitting relative pivotal movement between said second arms and said ends of the springs.

3. A tilting trailer bed construction as set forth in claim 2 wherein a second transverse shaft extends across said frame in parallel spaced relationship to said first transverse shaft, said second forwardly extending arms having the rear ends thereof integrally connected and pivotal with said second transverse shaft.

4. A tilting trailer bed construtcion as set forth in claim 3 wherein a crank wheel is secured on said second transverse shaft, flexible force transmitting means entrained on the crank wheel, actuating means connected to said frame for exerting force on said flexible cable for tilting said frame upwardly on the wheel axles.

5. A tilting trailer bed construction as set forth in claim 4 wherein a transverse bar is pivotally secured on a vertical pivot to one side of said frame and is adjustably secured on an opposite side of said frame for adjustment about said vertical pivot, said flexible cable being secured to said bar, and a fluid motor including an extendible piston rod secured between said transverse bar and a fixed portion of said frame for tiltably adjusting said frame about the axles of said wheels.

References Cited in the file of this patent

UNITED STATES PATENTS

| | | |
|---|---|---|
| 1,106,722 | Lindgren | Apr. 11, 1914 |
| 1,281,233 | Van Geert | Oct. 8, 1918 |
| 2,043,034 | Dalton | June 2, 1936 |
| 2,085,662 | Johnson | June 29, 1937 |
| 2,587,624 | Johnson | Mar. 4, 1952 |
| 2,610,865 | Cantrell | Sept. 16, 1952 |
| 2,621,942 | Getz | Dec. 16, 1952 |

FOREIGN PATENTS

| | | |
|---|---|---|
| 355,625 | Germany | June 30, 1922 |
| 271,746 | Great Britain | June 2, 1927 |